US009151335B2

(12) United States Patent
Cordes

(10) Patent No.: US 9,151,335 B2
(45) Date of Patent: Oct. 6, 2015

(54) BI-DIRECTIONAL FRICTION CLUTCH

(71) Applicant: Safe Flight Instrument Corporation, White Plains, NY (US)

(72) Inventor: Peter R. Cordes, Brookfield, CT (US)

(73) Assignee: SAFE FLIGHT INSTRUMENT CORPORATION, White Plains, NY (US)

(*) Notice: Subject to any disclaimer, the term of this patent is extended or adjusted under 35 U.S.C. 154(b) by 0 days.

(21) Appl. No.: 14/188,528

(22) Filed: Feb. 24, 2014

(65) Prior Publication Data

US 2015/0240882 A1 Aug. 27, 2015

(51) Int. Cl.
*F16D 13/70* (2006.01)
*F16D 13/38* (2006.01)
*B64C 13/32* (2006.01)
*F16D 13/44* (2006.01)
*F16D 125/36* (2012.01)

(52) U.S. Cl.
CPC ............... *F16D 13/70* (2013.01); *F16D 13/38* (2013.01); *B64C 13/32* (2013.01); *F16D 13/44* (2013.01); *F16D 2125/36* (2013.01)

(58) Field of Classification Search
CPC ...................................................... B64C 13/32

USPC ...................................................... 192/89.21
See application file for complete search history.

(56) References Cited

U.S. PATENT DOCUMENTS

| 3,118,292 | A | * | 1/1964 | Schroter | ................. | 464/36 |
| 3,360,088 | A | * | 12/1967 | Farr et al. | ................. | 192/70.11 |
| 5,205,389 | A | | 4/1993 | Raab et al. | | |
| 6,827,188 | B2 | | 12/2004 | Patridge | | |
| 2004/0182671 | A1 | | 9/2004 | Montanana | | |

FOREIGN PATENT DOCUMENTS

EP 2 009 310 12/2008

* cited by examiner

*Primary Examiner* — Ramya Burgess
*Assistant Examiner* — Mark Manley
(74) *Attorney, Agent, or Firm* — Morrison & Foerster LLP

(57) ABSTRACT

A clutch includes an input, an output, first and second control disks, and a control. The output and the input may be releasably coupled. The first control disk may be positioned between the input and the output. The first control disk and second control disk may be coupled and the output may be moveable between the control disks. The control may apply a torque to the second control disk, establishing a relative rotation between the output and the first control disk and decoupling the output and input.

23 Claims, 9 Drawing Sheets

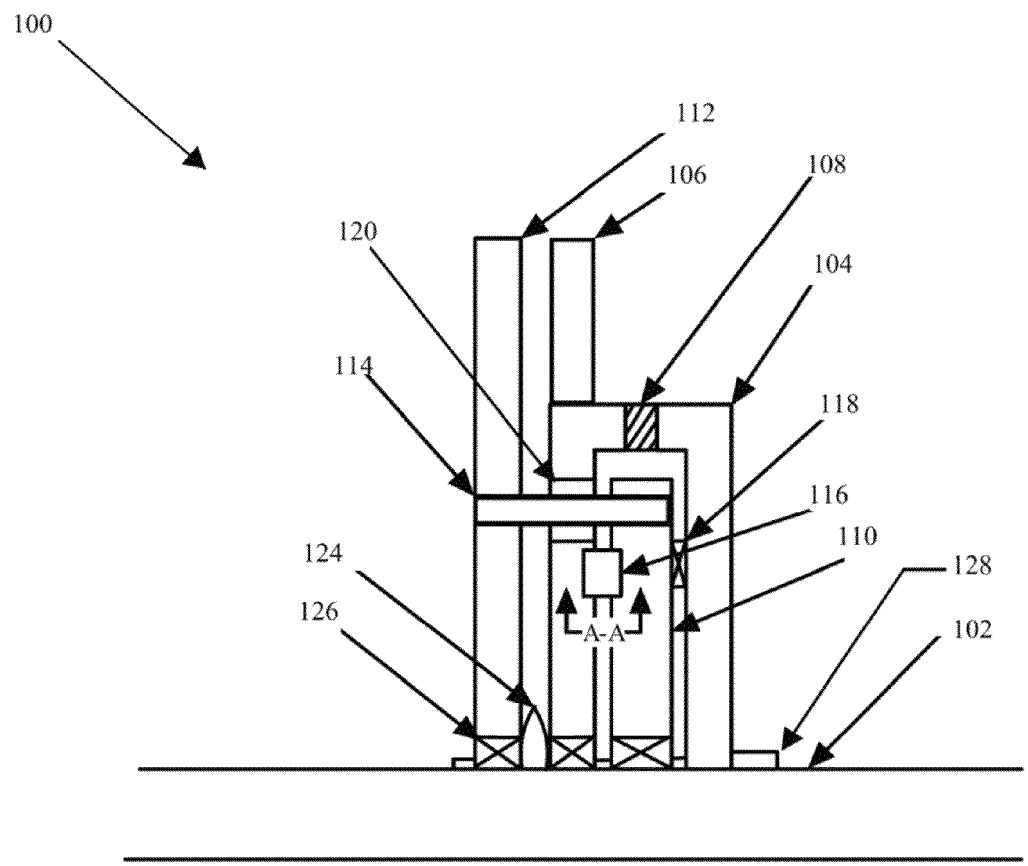
FIGURE 1A
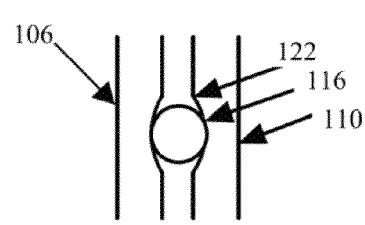
VIEW A-A  FIGURE 1B

BI-DIRECTIONAL FRICTION CLUTCH

FIELD OF THE DISCLOSURE

This disclosure generally relates to systems and methods for power transmission devices. More particularly, this disclosure relates to friction clutches.

BACKGROUND

A clutch may be used to selectively transmit power from one element of a system to another. In rotary clutches, friction surfaces on the elements allow rotation of one element to be transferred to another. The clutch selectively engages the friction surfaces, thereby selectively transmitting power from one element to the other.

Rotary clutches have proven costly to manufacture. Typically, these clutches require a large number of elements. A traditional rotary clutch may include an input and an output, with a complex system of control elements for selectively engaging and disengaging the input and output. In addition, assembly of such clutches can be costly due to the large number of parts associated with the control and the difficulty in assembling the parts correctly.

Some rotary clutches may require a large torque to disengage the input and the output. Typically, a torque somewhat similar to the torque provided by the input may be required to separate the elements.

SUMMARY

This disclosure relates to friction clutches and operating friction clutches. Advantageously, the clutches may be cost effective to manufacture and may require less torque when disengaging the input and output.

In one embodiment, a clutch includes an input, an output, first and second control disks, a compressive force member that presses the input member against the output member through the friction member and a control. The output and the input may be coupled such that they are releasable. The first control disk may be positioned between the input and the output. The first control disk and second control disk may be coupled and the output may be moveable between the control disks. The control may apply a torque to the second control disk, establishing a relative rotation between the output and the first control disk and decoupling the output and input.

As an exemplary advantage, the first control disk and second control disk can separate the input and the output and thus disengage the clutch. In addition to these four elements, the clutch may also include elements to couple the first and second control disk, relatively rotate the output and the first control disk, separate the output and the first control disk, and decouple the output and input. This arrangement may beneficially use fewer parts, less costly parts, and less assembly time than known clutches.

In some embodiments, the clutch may include a pocket between the output and the first control disk, where the pocket is defined by a groove in the output and a groove in the first control disk. There may be a roller in the pocket, the roller including a radius of curvature smaller than a radius of curvature of the pocket.

As an exemplary advantage, rollers in pockets may reduce the torque required to override the input disk. A relatively small torque may provide the separation necessary to overcome the force of the pressure spring thereby reducing the friction between the input and output. In some embodiments, the torque required may be significantly less than the torque between the input disk and the output disk.

In some embodiments, the output may include an opening and the clutch may include a drive rod that extends through the opening and couples the first and second control disks. In further embodiments, the drive rod and the opening may define a gap that limits a relative rotation of the output and the first control disk. The gap may limit the relative rotation to not more than 0.8 degrees. The gap may be 0.027 inches wide for every inch that the gap is spaced from a center of the output. In some embodiments, the clutch may include four drive rods that extend through four openings in the output and couple the first and second control disks. The openings may be equally spaced from a center of the output and may be separated by 90 degrees about the center.

In some embodiments, a spring between the output and second control disk may center drive rods in their respective openings. In some embodiments, a spring may bias the output and the input toward each other. In some embodiments, the clutch may include a bearing separating the input and the first control disk.

In some embodiments, the clutch may include opposing friction surfaces on the input and the output, located to enable contact between the friction surfaces when the input and output are coupled.

In one embodiment, a method includes providing an input and an output, providing a first control disk and a second control disk, and applying a torque to the second control disk. The input and the output may be coupled such that they are releasable. The first control disk and the second control disk may be coupled. The first control disk may be located between the input and the output and the output may be moveable between the first control disk and the second control disk. The torque may establish relative rotation between the output and the first control disk and may decouple the output and input.

In some embodiments, the method includes providing a groove in the output, providing a groove in the first control disk, and providing a roller. The groove in the output and the groove in the first control disk may define a pocket having a radius of curvature. The roller may be in the pocket and have a radius of curvature smaller than the radius of curvature of the pocket.

In some embodiments, the method may include extending the drive rod through the opening and coupling the first and second control disks. In some embodiments, the drive rod and the opening may define a gap that limits a relative rotation of the output and the first control disk.

BRIEF DESCRIPTION OF THE DRAWINGS

FIG. 1A depicts an example of a clutch in a cross-sectional view, in accordance with an embodiment. FIG. 1B depicts the clutch of FIG. 1A from a perspective taken through the line A-A.

DETAILED DESCRIPTION

Figure 2:
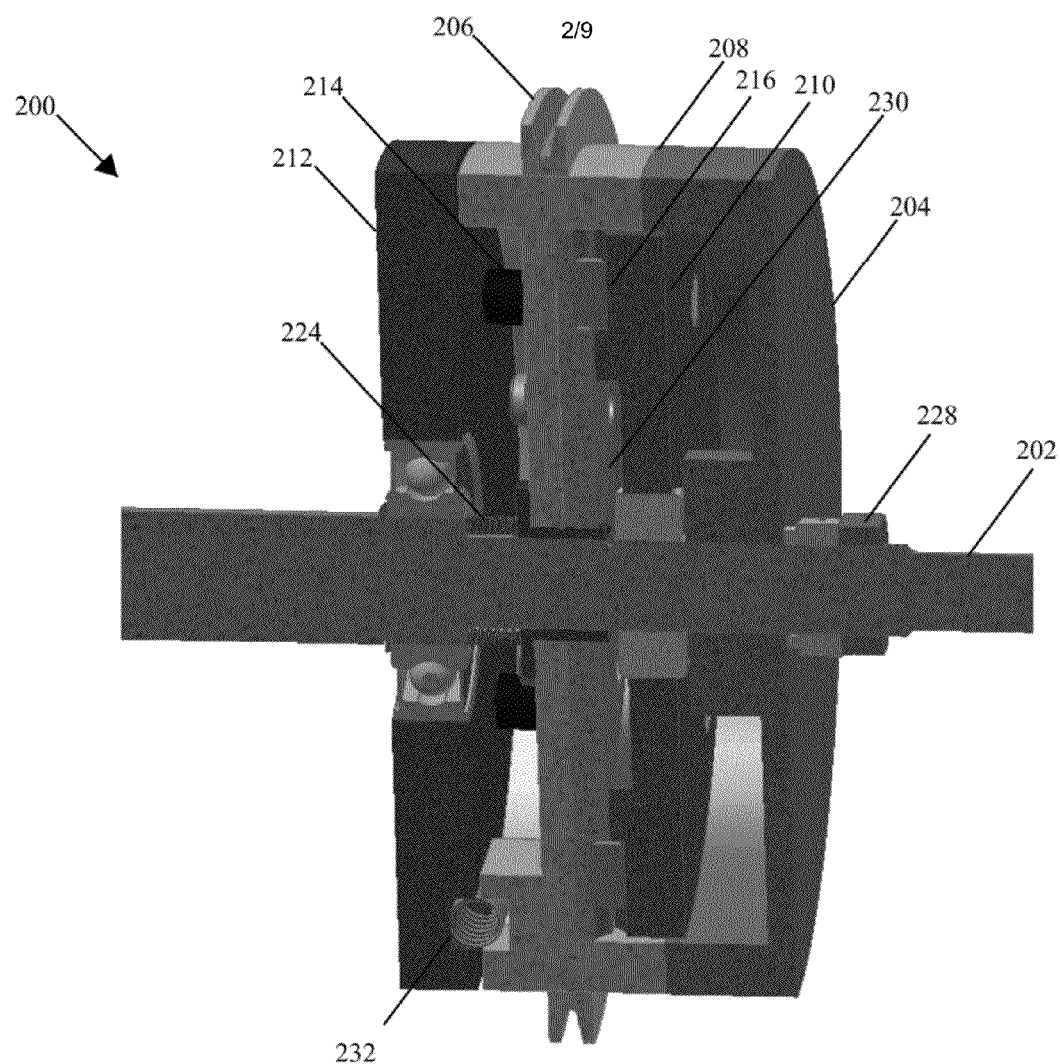
FIG. 2 depicts an example of a clutch, in accordance with an embodiment.

In the following description of embodiments, reference is made to the accompanying drawings which form a part hereof, and in which it is shown by way of illustration specific embodiments in which the claimed subject matter may be practiced. It is to be understood that other embodiments may be utilized and structural changes may be made without departing from the scope of the claimed subject matter.

In some embodiments, a clutch includes an input, an output, first and second control disks, and a control. The output and the input may be coupled such that they are releasable. The first control disk may be positioned between the input and the output. The first control disk and second control disk may be coupled and the output may be moveable between the control disks. The control may apply a torque to the second control disk, establishing a relative rotation between the output and the first control disk and decoupling the output and input.

As an exemplary advantage, the first control disk and second control disk can separate the input and the output and thus disengage the clutch. In addition to these four elements, the clutch may also include elements to couple the first and second control disk, relatively rotate the output and the first control disk, separate the output and the first control disk, and decouple the output and input. This arrangement may beneficially use fewer parts, less costly parts, and less assembly time than known clutches.

FIG. 1A depicts an example of a clutch 100 in a cross-sectional view, in accordance with an embodiment. Input shaft 102 may be coupled to input disk 104 such that input disk 104 rotates with input shaft 102. Input shaft 102 may be rotated by a motor, a motor/gearbox combination, or any source of rotary power.

In FIG. 1A, input disk 104 is releasably coupled to output disk 106 via friction surfaces 108, causing output disk 106 to rotate with input disk 104 and, consequently, to rotate with input shaft 102. As explained further below, output disk 106 can be decoupled from input disk 104, allowing input shaft 102 to rotate without rotating output disk 106.

A first control disk 110 and a second control disk 112 may be coupled by drive rod 114 so that the disks can rotate at the same angular speed. First control disk 110 may be positioned between input disk 104 and output disk 106. Output disk 106 may be moveable between first control disk 110 and second control disk 112. Roller 116 may be positioned between output disk 106 and first control disk 110. Bearing 118 may be positioned between input disk 106 and first control disk 110.

When input disk 104 and output disk 106 are coupled, each of input disk 104, output disk 106, first control disk 110, and second control disk 112 may rotate at the angular speed of input shaft 102. For example, rotation of the input shaft 102 may rotate the input disk 104, which may rotate the output disk 106 through the friction surfaces 108. Rotation of the output disk 106 may rotate the first control disk 110 through the rollers 116 and a centering spring which centers the drive rods 114 within the holes in output disc 106. Finally, rotation of first control disk 110 may rotate second control disk 112 through drive rods 114.

To decouple input disk 104 and output disk 106, a torque may be applied to second control disk 112 to reduce its angular speed. The reduction in angular speed of second control disk 112 may result in the same reduction in angular speed in first control disk 110 because first and second control disks may be coupled by drive rod 114. The reduction in angular speed may decouple input disk 104 and output disk 106 at the friction surface 108, as described below with respect to FIG. 1B.

FIG. 1B depicts the clutch of FIG. 1A from a perspective taken through the line A-A. Roller 116 may be positioned within pocket 122 formed by a pair of grooves in output disk 106 and first control disk 110. The grooves may have a radius of curvature larger than the radius of curvature of roller 116. As a result, the separation between output disk 106 and first control disk 110 may be less when the roller 116 is centered in the grooves. That is, a relative rotation between output disk 106 and first control disk 110 may cause roller 116 to be off center in the groove, which may increase the separation between output disk 106 and first control disk 110.

Some embodiments may have 3, 4, or any number of rollers and respective pockets. The rollers may be equally spaced.

First control disk 110 and input disk 104 may be arranged so that a separation between first control disk 110 and output disk 106 separates input disk 104 and output disk 106, that is, may decouple input disk 104 and output disk 106. In the example of FIG. 1A, thrust bearing 118 may be positioned between first control disk 110 and input disk 104 so that input disk 104 and output disk 106 separate when first control disk 104 and output disk 106 separate. Some embodiments may not have a thrust bearing between first control disk 110 and input disk 104.

As an exemplary advantage, roller 116 may reduce the torque required to override the input disk 104. A relatively small torque may provide the separation necessary to reduce the friction between input disk 104 and output disk 106. In some embodiments, the torque required may be significantly less than the torque between the input disk 104 and the output disk 106.

Drive rod 114 may extend through an opening 120 in output disk 106. A gap between drive rod 114 and opening 120 may limit the relative rotation between output disk 106 and first control disk 110. In some embodiments, a spring may be positioned between output disk 106 and second control disk 112 to center the drive rod 114.

Some embodiments may include 1, 2, 3, 4, or any number of drive rods and corresponding openings. The rods may be equally spaced. Each drive rod may be designed to overcome the full friction of the clutch without failing.

Spring 124 may be positioned between output 106 and second control disk 112 to bias output disk 106 toward input disk 104. The spring's restoring force may be varied to suit a variety of applications.

Bearings 126 may be used to center output disk 106, first control disk 110, and second control disk 112 on a common axis of rotation, such as shaft 102, for example. Nut 128 may fix input disk 104 onto input shaft 102.

In some embodiments, output disk 106 may be attached to a device that is selectively operated (for example, the fuel control of an engine) by a radial arm (not shown) through a pushrod or a gear, non-slip belt, chain, or other force transmission device (not shown).

In some embodiments, clutch 100 may facilitate a clockwise and anti-clockwise rotation.

FIG. 2 depicts an example of a clutch 200, in accordance with an embodiment. Clutch 200 may have some similar features as clutch 100. For efficiency, similar features are not re-described with respect to clutch 200.

Clutch 200 includes an input disk 204 coupled to shaft 202, an output disk 206, a first control disk 210 between the input and output disks, and a second control disk 212 coupled to first control disk 210. Rotation of shaft 202 rotates the elements of clutch 200 in a similar manner to clutch 100.

Clutch 200 includes an output roller disk 230 coupled to output disk 206. Openings in output roller disk 203 align with openings in output disk 206, through which drive rods 214 can extend to couple first control disk 210 and second control disk 212. Output roller disk 230 includes grooves (not shown) which, together with grooves on first control disk 210, form pockets in which rollers 216 lie. A torque on second control disk 212 relatively rotates first control disk 210 and output roller disk 230, thereby separating output disk 206 from input disk 204.

A first spring 224 biases output disk 206 in the direction of input disk 204 to couple the disks. The spring's restoring force may be varied to suit a variety of applications. A second spring 232 may center drive rods 214 in their respective openings.

Figure 3:
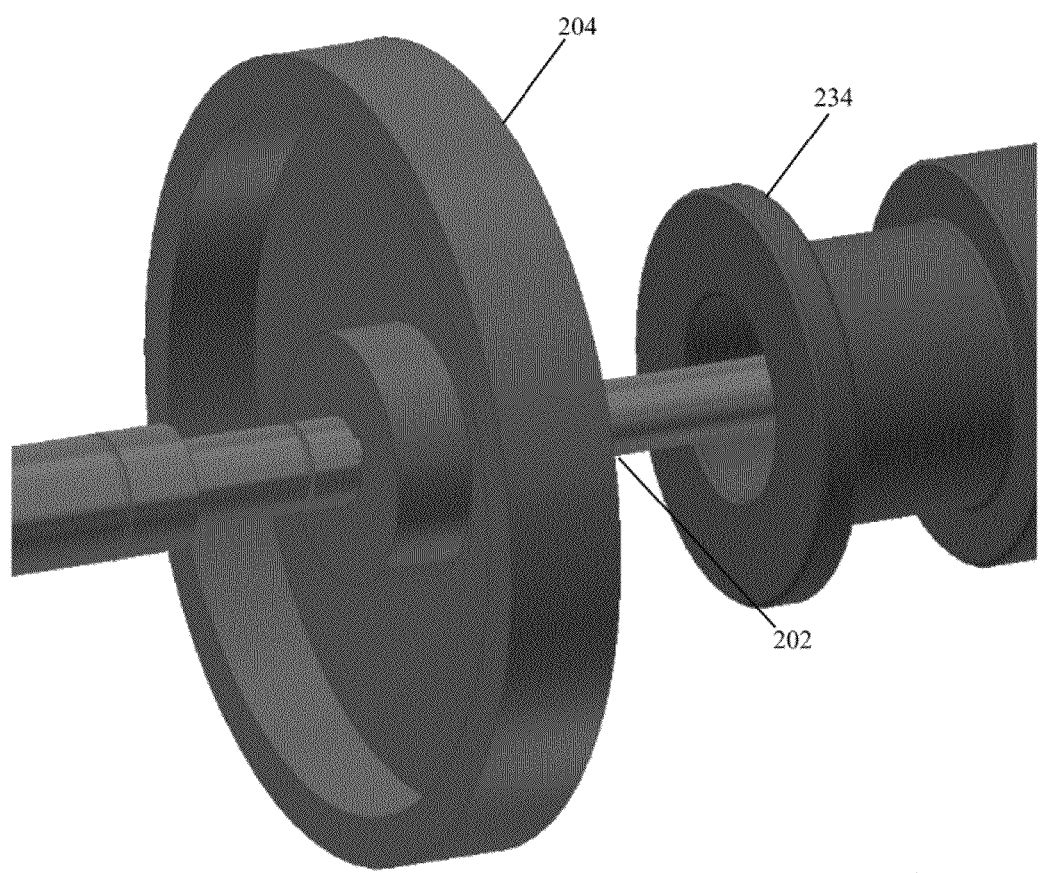
FIG. 3 depicts a motor, rotating shaft, and output disk of the clutch of FIG. 2.
Figure 4:
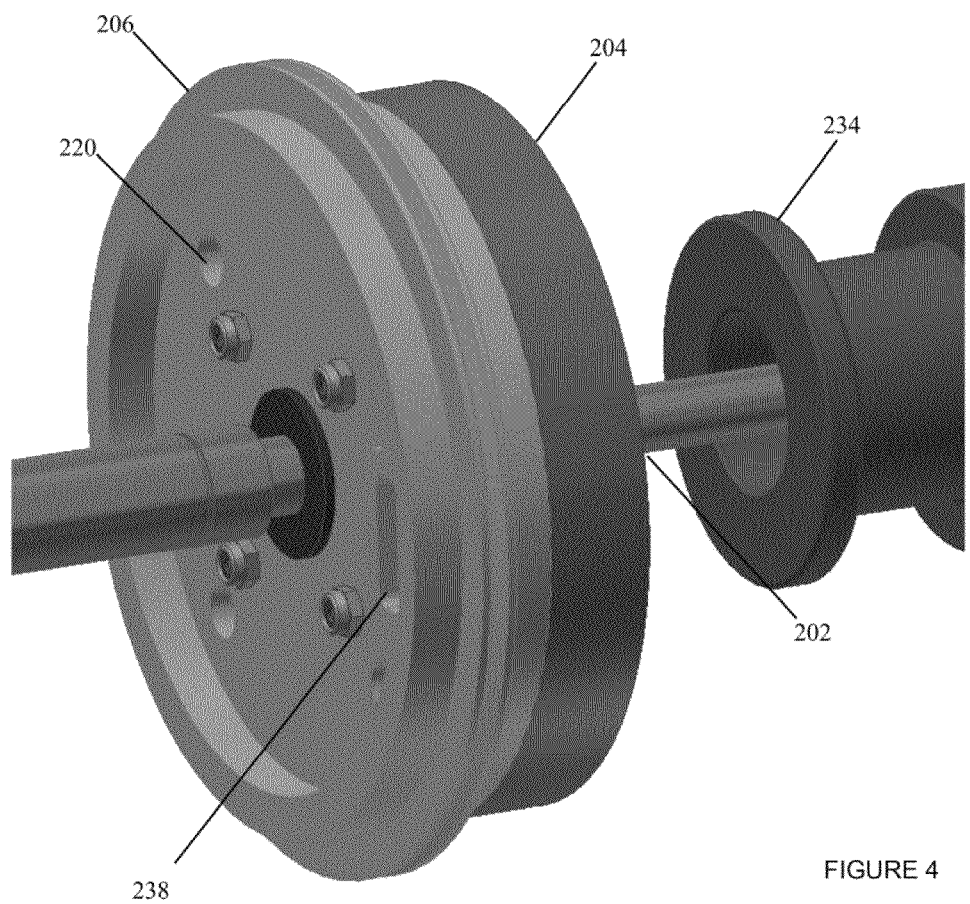
FIG. 4 depicts the components of FIG. 3 with the output disk coupled to an input disk.

FIGS. 3-8 illustrate components of clutch 200. FIG. 3 depicts motor 234, rotating shaft 202, and output disk 206 coupled to the shaft, in accordance with an embodiment. FIG. 4 depicts the same components as FIG. 3 with output disk 206 coupled to input disk 204. A groove 238 on output disk 206 may be sized to house a spring connected to second control disk 212.

Figure 5:
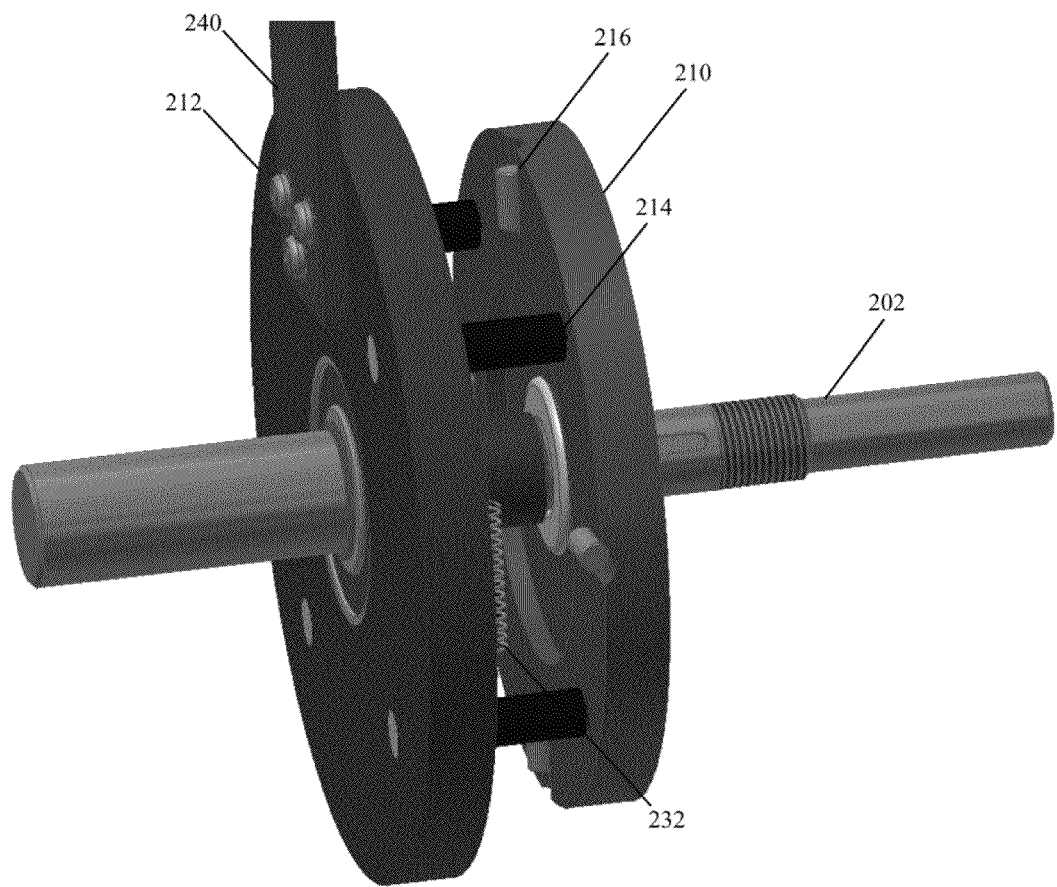
FIG. 5 depicts a first control disk and a second control disk of the clutch of FIG. 2.

FIG. 5 depicts first control disk 210 and second control disk 212 of clutch 200. Drive rods 214 couple first control disk 212 and second control disk 212. Second spring 232 is positioned on second control disk 212 so that the spring lies in groove 238 on output disk 206. Handle 240 is attached to second control disk 212 and may be used by an operator to apply a torque to second control disk 212. In some embodiments, a torque may be applied to second control disk 112 using a radial arm through a pushrod or a non-slip belt, gear, chain, or other force transmission device.

Figure 6:
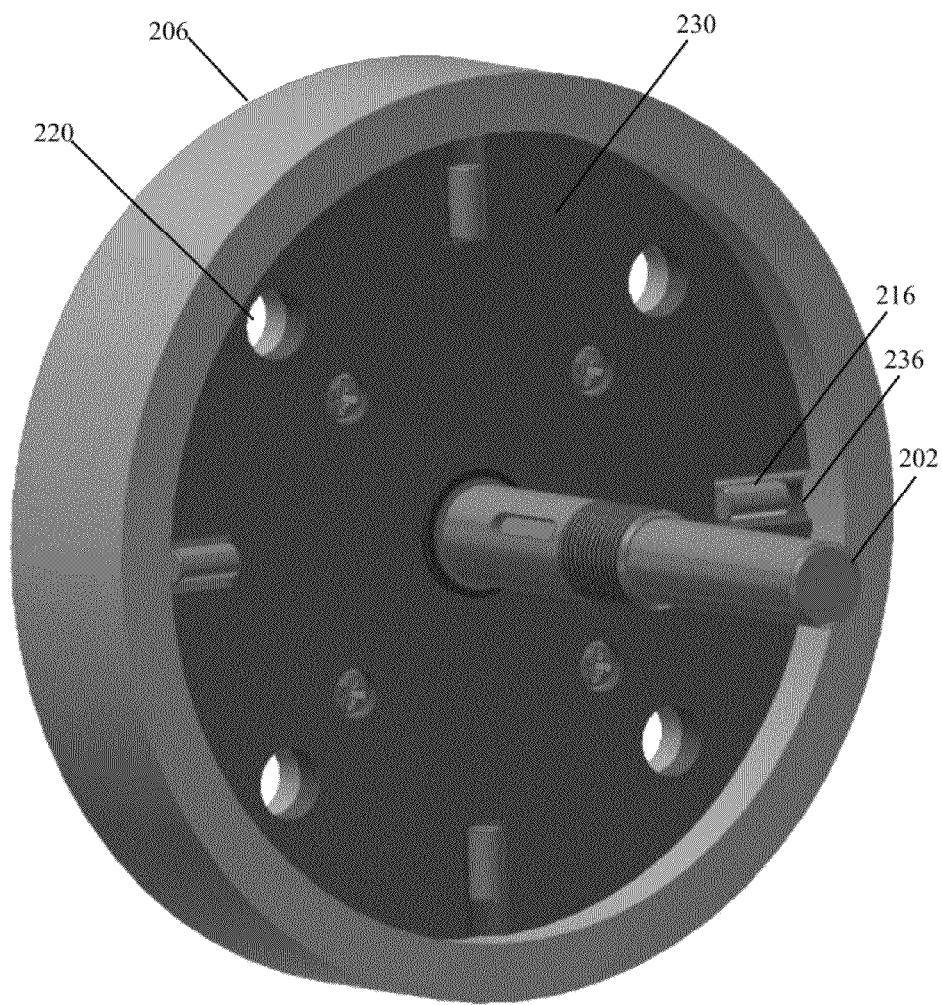
FIG. 6 depicts an output disk and an output roller disk of the clutch of FIG. 2.

FIG. 6 depicts output disk 206 and output roller disk 230 of clutch 200. Rollers 216 lie in grooves 236 of second roller disk 230. Grooves 236, together with grooves on first control disk 210, form pockets in which rollers 216 lie.

Figure 7:
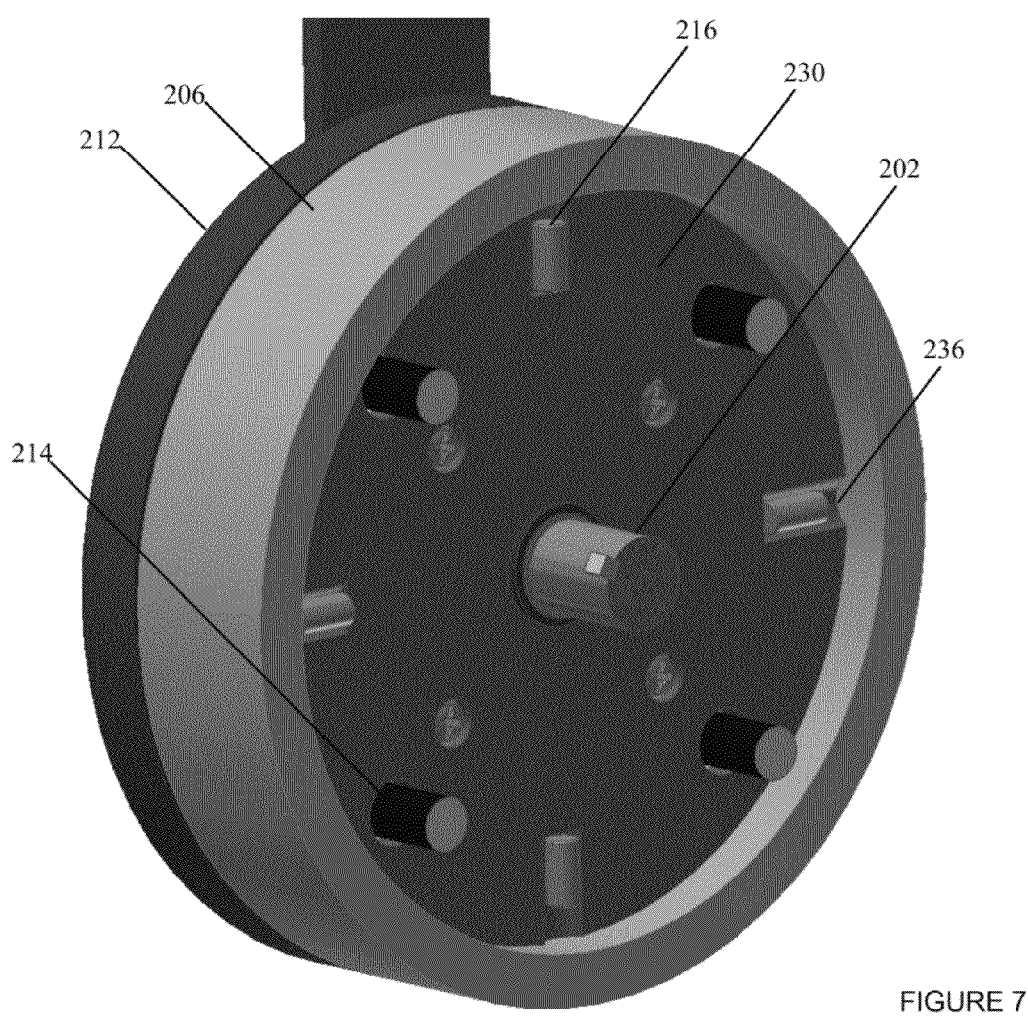
FIG. 7 depicts an output disk, an output roller disk, and a second control disk of the clutch of FIG. 2.

FIG. 7 depicts output disk 206, output roller disk 230, and second control disk 214 coaxially arranged on shaft 202. Drive rods 214 extend through openings in output disk 206 and output roller disk 230.

Figure 8A:
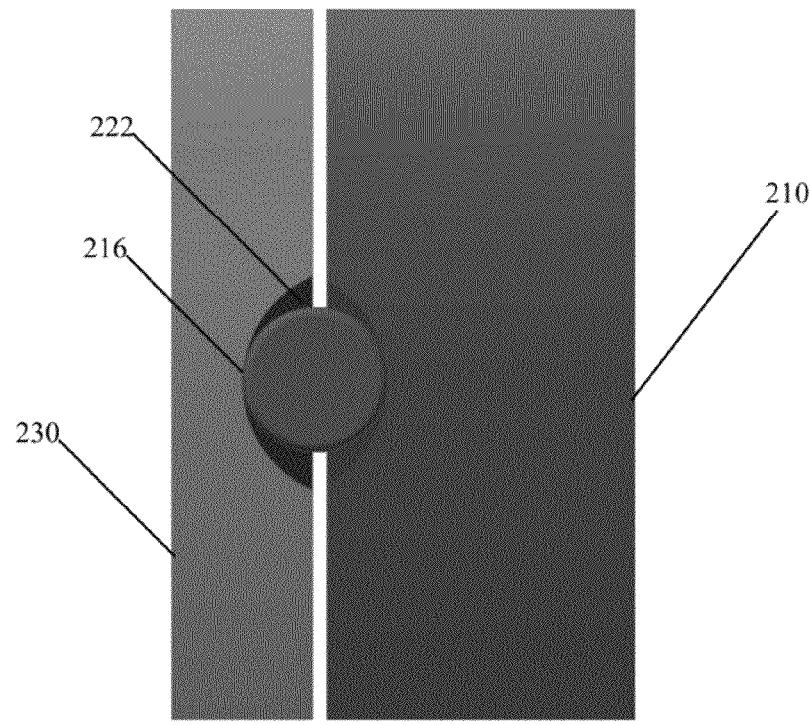
FIG. 8A depicts a roller in a pocket when the clutch of FIG. 2 couples an input and an output.
Figure 8B:
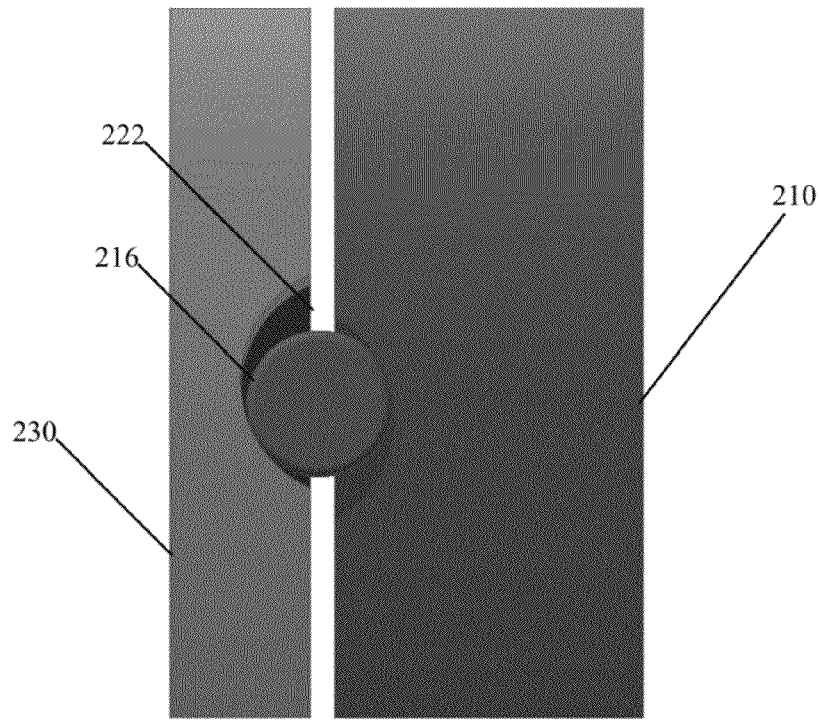
FIG. 8B depicts the roller in the pocket when the first control disk of the clutch of FIG. 2 is relatively rotated with respect to the control roller disk.

FIG. 8A depicts roller 216 in pocket 222 when clutch 200 couples an input and output. FIG. 8B depicts roller 216 in pocket 222 when first control disk 210 is relatively rotated with respect to control roller disk 230.

The radius of curvature of roller 216 is smaller than the radius of curvature of the grooves of pocket 222. Accordingly, the gap which separates output roller disk 230 and first control disk 210 is determined by the position of roller 216 in the center pocket 222: the gap is narrower when roller 216 is centered in pocket 222.

Figure 9:
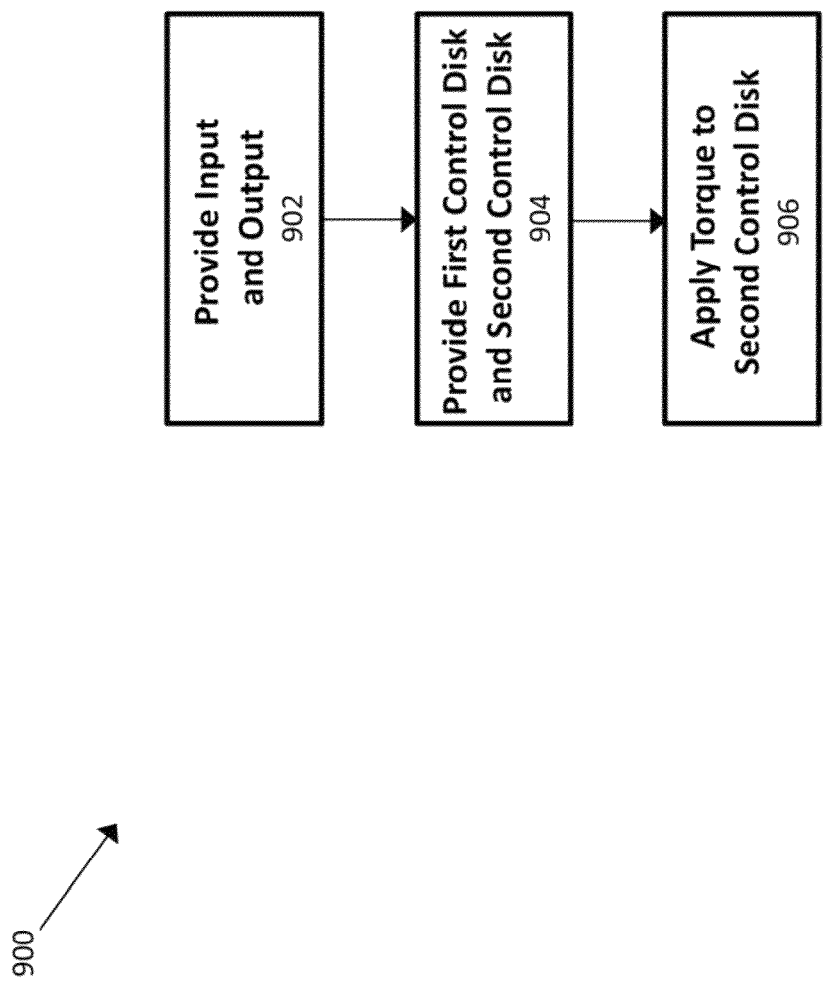
FIG. 9 illustrates a method, in accordance with an embodiment.

FIG. 9 illustrates a method 900, in accordance with an embodiment. Method 900 includes providing an input and an output 902, providing a first control disk and a second control disk 904, and applying a torque to the second control disk 906. The input and the output may be releasably coupled. The first control disk and the second control disk may be coupled. The first control disk may be located between the input and the output and the output may be moveable between the first control disk and the second control disk. The torque may establish relative rotation between the output and the first control disk and may decouple the output and input.

In some embodiments, method 900 may also include providing a groove in the output, providing a groove in the first control disk, and providing a roller. The groove in the output and the groove in the first control disk may define a pocket having a radius of curvature. The roller may be in the pocket and may have a radius of curvature smaller than the radius of curvature of the pocket.

In some embodiments, method 900 may include extending the drive rod through the opening and coupling the first and second control disks. The drive rod and the opening may define a gap that limits a relative rotation of the output and the first control disk.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A clutch comprising:
   an input,
   an output comprising an opening, the input and the output being releasably coupled,
   a first control disk between the input and the output,
   a second control disk, the first control disk and the second control disk being coupled, the output being moveable between the first control disk and the second control disk,
   a control that applies a torque to the second control disk to establish relative rotation between the output and the first control disk and that decouples the output and input, and
   a drive rod that extends through the opening and couples the first and second control disks, the drive rod and the opening defining a gap that limits relative rotation between the output and the first control disk.

2. The clutch of claim 1, comprising:
   a groove in the output, a groove in the first control disk, the groove in the output and the groove in the first control disk defining a pocket having a radius of curvature, and a roller in the pocket, the roller having a radius of curvature smaller than the radius of curvature of the pocket.

3. The clutch of claim 1, wherein the gap limits relative rotation between the output and the first control disk to not more than 0.8 degrees.

4. The clutch of claim 1, wherein the gap has a width of 0.027 inches for every inch that the gap is spaced from a center of the output.

5. The clutch of claim 1, comprising four drive rods that extend through four openings in the output and that couple the first and second control disks.

6. The clutch of claim 5, wherein the openings are equally spaced from a center of the output and are separated by 90 degrees about the center.

7. The clutch of claim 1 comprising a spring between the output and the second control disk that centers the drive rod in the opening.

8. The clutch of claim 1 comprising a spring that biases the output and the input towards each other.

9. The clutch of claim 1 comprising a bearing that separates the input and the first control disk.

10. The clutch of claim 1 comprising opposing friction surfaces on the input and the output, located to enable contact between the friction surfaces when the input and output are coupled.

11. A method comprising:
providing an input,
providing an output comprising an opening, the input and the output being releasably coupled,
providing a first control disk and a second control disk, the first control disk and the second control disk being coupled, the first control disk being located between the input and the output, the output being moveable between the first control disk and the second control disk,
extending a drive rod through the opening,
coupling the first and second control disks with the drive rod, the drive rod and the opening defining a gap that limits a relative rotation of the output and the first control disk, and
applying a torque to the second control disk to establish relative rotation between the output and the first control disk and decouple the output and input.

12. The method of claim 11, comprising
providing a groove in the output,
providing a groove in the first control disk, the groove in the output and the groove in the first control disk defining a pocket having a radius of curvature, and
providing a roller in the pocket, the roller having a radius of curvature smaller than the radius of curvature of the pocket.

13. A clutch comprising:
an input,
an output comprising an opening, the input and the output being releasably coupled,
a first control disk between the input and the output,
a second control disk, the first control disk and the second control disk being coupled, the output being moveable between the first control disk and the second control disk, a control that applies a torque to the second control disk to establish relative rotation between the output and the first control disk and that decouples the output and input,
a drive rod that extends through the opening and couples the first and second control disks, and
a spring between the output and the second control disk that centers the drive rod in the opening.

14. The clutch of claim 13, wherein the drive rod and the opening define a gap that limits relative rotation between the output and the first control disk, and wherein the gap limits relative rotation between the output and the first control disk to not more than 0.8 degrees.

15. The clutch of claim 13, wherein the drive rod and the opening define a gap that limits relative rotation between the output and the first control disk, and wherein the gap has a width of 0.027 inches for every inch that the gap is spaced from a center of the output.

16. The clutch of claim 13, comprising four drive rods that extend through four openings in the output and that couple the first and second control disks.

17. The clutch of claim 16, wherein the openings are equally spaced from a center of the output and are separated by 90 degrees about the center.

18. The clutch of claim 13 comprising a second spring that biases the output and the input towards each other.

19. The clutch of claim 13 comprising a bearing that separates the input and the first control disk.

20. The clutch of claim 13 comprising opposing friction surfaces on the input and the output, located to enable contact between the friction surfaces when the input and output are coupled.

21. A method comprising:
providing an input,
providing an output comprising an opening, the input and the output being releasably coupled,
providing a first control disk and a second control disk, the first control disk and the second control disk being coupled, the first control disk being located between the input and the output, the output being moveable between the first control disk and the second control disk,
extending a drive rod through the opening,
coupling the first and second control disks with the drive rod,
applying a torque to the second control disk to establish relative rotation between the output and the first control disk and decouple the output and input, and
centering the drive rod in the opening with a spring between the output and the second control disk.

22. The method of claim 21, comprising
providing a groove in the output,
providing a groove in the first control disk, the groove in the output and the groove in the first control disk defining a pocket having a radius of curvature, and
providing a roller in the pocket, the roller having a radius of curvature smaller than the radius of curvature of the pocket.

23. The method of claim 21, wherein the drive rod and the opening define a gap that limits a relative rotation of the output and the first control disk.

* * * * *